(12) United States Patent
Khalid

(10) Patent No.: US 11,122,525 B1
(45) Date of Patent: Sep. 14, 2021

(54) WIRELESS CHANNEL ACCESS AND POWER ADJUST ACCESS REQUESTS

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/910,410

(22) Filed: Jun. 24, 2020

(51) Int. Cl.
| | | |
|---|---|---|
| *H04W 52/38* | (2009.01) | |
| *H04B 17/309* | (2015.01) | |
| *H04W 76/10* | (2018.01) | |
| *H04W 92/10* | (2009.01) | |

(52) U.S. Cl.
CPC .......... *H04W 52/38* (2013.01); *H04B 17/309* (2015.01); *H04W 76/10* (2018.02); *H04W 92/10* (2013.01)

(58) Field of Classification Search
CPC ..... H04W 52/38; H04W 76/10; H04W 92/10; H04B 17/309
USPC .................................................. 455/522, 69
See application file for complete search history.

(56) References Cited

U.S. PATENT DOCUMENTS

| | | | | |
|---|---|---|---|---|
| 6,498,934 B1 * | 12/2002 | Muller | ................. | H04W 16/10 455/450 |
| 6,785,510 B2 * | 8/2004 | Larsen | ................. | H04W 88/04 455/11.1 |
| 7,043,254 B2 * | 5/2006 | Chawla | ................. | H04W 16/18 455/423 |
| 7,697,936 B2 * | 4/2010 | Hosono | ................. | H04W 24/02 455/446 |
| 7,995,967 B2 * | 8/2011 | Li | ....................... | H04L 27/2613 455/63.1 |
| 8,130,667 B2 * | 3/2012 | Bertrand | ............... | H04L 1/0007 370/252 |
| 8,504,091 B2 * | 8/2013 | Palanki | ............ | H04W 72/0413 455/522 |
| 8,554,147 B2 * | 10/2013 | Bhattad | ................ | H04L 5/0073 455/63.1 |
| 8,594,028 B2 * | 11/2013 | Mark | .................. | H04W 52/146 370/329 |

(Continued)

*Primary Examiner* — Hai V Nguyen
(74) *Attorney, Agent, or Firm* — Armis IP Law, LLC

(57) ABSTRACT

A wireless network environment includes a wireless base station and multiple mobile communication devices. A first mobile communication device transmits a first wireless communication from a first mobile communication device to establish a wireless communication link with a wireless base station. The first mobile communication device receives communication information from a second mobile communication device in the wireless network environment. The first mobile communication device uses the communication information from the second mobile communication device to establish the wireless communication link between the first mobile communication device and the wireless base station. For example, the communication information indicates a magnitude of a wireless pathloss between the second mobile communication device and the wireless base station. The first mobile communication device uses the wireless pathloss as specified by the communication information as a basis to set a power level of communicating a second wireless communication to the wireless base station.

39 Claims, 14 Drawing Sheets

(56) References Cited

U.S. PATENT DOCUMENTS

| | | | | |
|---|---|---|---|---|
| 8,712,461 B2* | 4/2014 | Yavuz | H04W 52/40 | 455/522 |
| 8,767,522 B2* | 7/2014 | Li | H04B 1/707 | 370/203 |
| 8,811,266 B2* | 8/2014 | Choi | H04W 72/1231 | 370/318 |
| 8,811,374 B2* | 8/2014 | Charbit | H04W 76/14 | 370/350 |
| 9,055,534 B2* | 6/2015 | Kim | H04W 52/146 | |
| 9,072,055 B2* | 6/2015 | Jongren | H04W 52/244 | |
| 9,107,173 B2* | 8/2015 | Gao | H04W 74/0833 | |
| 9,215,647 B2* | 12/2015 | Vannithamby | H04B 7/0486 | |
| 9,345,046 B2* | 5/2016 | Li | H04W 74/08 | |
| 9,516,608 B2* | 12/2016 | Seo | H04W 52/242 | |
| 9,560,574 B2* | 1/2017 | Chatterjee | H04W 40/246 | |
| 9,642,099 B2* | 5/2017 | Bagheri | H04W 52/243 | |
| 9,661,586 B2* | 5/2017 | Gao | H04W 52/243 | |
| 9,832,776 B2* | 11/2017 | Peng | H04W 52/367 | |
| 9,848,338 B2* | 12/2017 | Randall | H04W 16/22 | |
| 9,867,140 B2* | 1/2018 | Vannithamby | H04B 7/0632 | |
| 10,075,927 B2* | 9/2018 | Seo | H04W 52/44 | |
| 10,219,279 B2* | 2/2019 | Baghel | H04W 52/38 | |
| 10,368,351 B1* | 7/2019 | Syed | H04W 52/365 | |
| 10,455,514 B2* | 10/2019 | Oh | H04W 52/38 | |
| 10,477,577 B2* | 11/2019 | Jeon | H04W 52/325 | |
| 10,492,151 B2* | 11/2019 | Akkarakaran | H04W 52/48 | |
| 10,555,303 B2* | 2/2020 | Syed | H04W 72/048 | |
| 10,660,077 B2* | 5/2020 | MolavianJazi | H04W 72/044 | |
| 10,708,088 B2* | 7/2020 | Park | H04B 7/0639 | |
| 10,716,148 B2* | 7/2020 | Kim | H04W 56/00 | |
| 10,721,699 B2* | 7/2020 | Khalid | H04W 56/006 | |
| 10,764,841 B2* | 9/2020 | Syed | H04W 52/143 | |
| 10,944,449 B2* | 3/2021 | Xie | H04B 7/024 | |
| 10,952,085 B2* | 3/2021 | Kim | H04W 24/08 | |
| 2001/0036810 A1* | 11/2001 | Larsen | H04W 88/04 | 455/11.1 |
| 2002/0142788 A1* | 10/2002 | Chawla | H04W 16/18 | 455/504 |
| 2003/0156594 A1* | 8/2003 | Trott | H04L 27/18 | 370/442 |
| 2006/0268924 A1* | 11/2006 | Marinier | H04W 52/242 | 370/445 |
| 2007/0183374 A1* | 8/2007 | Classon | H04W 36/0085 | 370/338 |
| 2008/0039129 A1* | 2/2008 | Li | H04W 52/241 | 455/522 |
| 2008/0200203 A1* | 8/2008 | Malladi | H04W 52/44 | 455/522 |
| 2008/0207150 A1* | 8/2008 | Malladi | H04L 5/0048 | 455/127.1 |
| 2008/0305822 A1* | 12/2008 | Li | H04W 74/0833 | 455/522 |
| 2009/0290550 A1* | 11/2009 | Bhattad | H04L 5/0073 | 370/329 |
| 2009/0325625 A1* | 12/2009 | Hugl | H04W 52/244 | 455/522 |
| 2010/0081449 A1* | 4/2010 | Chaudhri | H04W 72/082 | 455/452.2 |
| 2010/0093364 A1* | 4/2010 | Ribeiro | H04W 72/082 | 455/452.2 |
| 2010/0142458 A1* | 6/2010 | Mark | H04L 5/0073 | 370/329 |
| 2010/0261469 A1* | 10/2010 | Ribeiro | H04W 99/00 | 455/423 |
| 2011/0176498 A1* | 7/2011 | Montojo | H04W 72/048 | 370/329 |
| 2011/0182280 A1* | 7/2011 | Charbit | H04W 56/0045 | 370/350 |
| 2011/0191187 A1* | 8/2011 | Charbit | H04W 4/23 | 705/14.64 |
| 2011/0199985 A1* | 8/2011 | Cai | H04L 27/0012 | 370/329 |
| 2011/0243257 A1* | 10/2011 | Lucidarme | H04B 7/022 | 375/259 |
| 2011/0275361 A1* | 11/2011 | Yavuz | H04W 52/244 | 455/422.1 |
| 2012/0093098 A1* | 4/2012 | Charbit | H04W 52/343 | 370/329 |
| 2013/0016603 A1* | 1/2013 | Novak | H04L 5/0037 | 370/216 |
| 2013/0053050 A1* | 2/2013 | Kang | H04B 7/022 | 455/452.1 |
| 2013/0148637 A1* | 6/2013 | Yang | H04W 72/044 | 370/336 |
| 2013/0165105 A1* | 6/2013 | Whinnett | H04W 24/10 | 455/422.1 |
| 2013/0178221 A1* | 7/2013 | Jung | H04L 9/0844 | 455/450 |
| 2013/0223414 A1* | 8/2013 | Li | H04B 1/711 | 370/336 |
| 2013/0272262 A1* | 10/2013 | Li | H04L 5/0023 | 370/330 |
| 2013/0273926 A1* | 10/2013 | Peng | H04B 7/15528 | 455/450 |
| 2013/0281143 A1* | 10/2013 | Nentwig | H04B 17/345 | 455/501 |
| 2013/0295983 A1* | 11/2013 | Kim | H04W 52/383 | 455/522 |
| 2014/0003262 A1* | 1/2014 | He | H04L 5/14 | 370/252 |
| 2014/0044081 A1* | 2/2014 | Mark | H04W 52/146 | 370/329 |
| 2014/0056220 A1* | 2/2014 | Poitau | H04W 76/14 | 370/328 |
| 2014/0078971 A1* | 3/2014 | Bontu | H04W 8/005 | 370/329 |
| 2014/0106769 A1* | 4/2014 | Bai | H04L 5/0032 | 455/452.1 |
| 2014/0198694 A1* | 7/2014 | Yang | H04W 72/0446 | 370/311 |
| 2014/0226504 A1* | 8/2014 | Tavildar | H04W 72/1226 | 370/252 |
| 2014/0295873 A1* | 10/2014 | Lunden | H04W 52/38 | 455/454 |
| 2014/0314125 A1* | 10/2014 | Li | H04L 5/0028 | 375/140 |
| 2015/0024802 A1* | 1/2015 | Callard | H04W 88/08 | 455/561 |
| 2015/0078270 A1* | 3/2015 | Seo | H04W 52/248 | 370/329 |
| 2015/0223141 A1* | 8/2015 | Chatterjee | H04L 5/0092 | 370/329 |
| 2015/0282096 A1* | 10/2015 | Senarath | H04W 52/247 | 455/522 |
| 2015/0327188 A1* | 11/2015 | Bagheri | H04W 76/14 | 455/426.1 |
| 2016/0037385 A1* | 2/2016 | Boudreau | H04W 28/18 | 370/328 |
| 2016/0037530 A1* | 2/2016 | Peng | H04B 17/382 | 370/329 |
| 2016/0057709 A1* | 2/2016 | Gao | H04W 52/367 | 455/452.2 |
| 2016/0150484 A1* | 5/2016 | Seo | H04W 52/322 | 455/522 |
| 2016/0174172 A1* | 6/2016 | Rahman | H04W 52/362 | 455/522 |
| 2016/0198412 A1* | 7/2016 | Uplenchwar | H04W 52/16 | 455/522 |
| 2016/0205525 A1* | 7/2016 | Baghel | H04W 72/042 | 370/329 |
| 2016/0269486 A1* | 9/2016 | Gupta | H04W 4/70 | |
| 2016/0286571 A1* | 9/2016 | Gattami | H04W 4/70 | |
| 2017/0026915 A1* | 1/2017 | Madan | H04W 52/146 | |
| 2017/0041806 A1* | 2/2017 | Randall | H04W 16/22 | |
| 2017/0064638 A1* | 3/2017 | Li | H04W 76/14 | |
| 2017/0078492 A1* | 3/2017 | Schmidt | H04W 16/14 | |
| 2017/0171690 A1* | 6/2017 | Kim | H04L 51/02 | |
| 2017/0188311 A1* | 6/2017 | Hwang | H04L 1/1893 | |

(56) References Cited

U.S. PATENT DOCUMENTS

| | | | |
|---|---|---|---|
| 2017/0188312 A1* | 6/2017 | Wang | H04W 52/367 |
| 2017/0188320 A1* | 6/2017 | Xiong | H04W 72/044 |
| 2017/0208554 A1* | 7/2017 | Hoshino | H04W 52/247 |
| 2017/0303291 A1* | 10/2017 | Chae | H04W 72/12 |
| 2017/0359840 A1* | 12/2017 | Ly | H04L 1/1671 |
| 2017/0367067 A1* | 12/2017 | Hwang | H04B 17/327 |
| 2018/0084562 A1* | 3/2018 | Ramamurthi | H04B 17/309 |
| 2018/0227882 A1* | 8/2018 | Freda | H04W 72/085 |
| 2018/0324853 A1* | 11/2018 | Jeon | H04W 74/006 |
| 2018/0359711 A1* | 12/2018 | Akkarakaran | H04W 52/325 |
| 2019/0174423 A1* | 6/2019 | Zhang | H04W 52/241 |
| 2019/0181910 A1* | 6/2019 | Goto | H04L 5/0016 |
| 2019/0200365 A1* | 6/2019 | Sampath | H04B 1/3838 |
| 2019/0261413 A1* | 8/2019 | Fodor | H04W 74/0808 |
| 2019/0357151 A1* | 11/2019 | Zhang | H04W 52/243 |
| 2019/0387484 A1* | 12/2019 | Ioffe | H04W 4/70 |
| 2019/0394805 A1* | 12/2019 | Kim | H04W 56/00 |
| 2020/0053657 A1* | 2/2020 | MolavianJazi | H04W 52/281 |
| 2020/0053710 A1* | 2/2020 | MolavianJazi | H04W 52/34 |
| 2020/0053724 A1* | 2/2020 | MolavianJazi | H04W 72/10 |
| 2020/0053743 A1* | 2/2020 | Cheng | H04W 52/245 |
| 2020/0092828 A1* | 3/2020 | Akkarakaran | H04W 52/242 |
| 2020/0112931 A1* | 4/2020 | Khalid | H04W 56/0015 |
| 2020/0146057 A1* | 5/2020 | Jeon | H04W 52/325 |
| 2020/0205085 A1* | 6/2020 | Li | H04B 7/0682 |
| 2020/0205093 A1* | 6/2020 | Kim | H04L 25/0226 |
| 2020/0220612 A1* | 7/2020 | Thomas | H04B 17/309 |
| 2020/0229106 A1* | 7/2020 | Nguyen | H04W 52/245 |
| 2020/0229180 A1* | 7/2020 | Liu | H04W 72/0453 |
| 2020/0275479 A1* | 8/2020 | Peisa | H04W 74/008 |
| 2020/0287753 A1* | 9/2020 | Park | H04W 80/02 |
| 2020/0305187 A1* | 9/2020 | Takeda | H04W 28/18 |
| 2020/0314760 A1* | 10/2020 | Ye | H04W 74/006 |
| 2020/0322977 A1* | 10/2020 | Yasukawa | H04L 5/0053 |
| 2020/0366337 A1* | 11/2020 | Xie | H04W 74/08 |
| 2020/0374806 A1* | 11/2020 | Manolakos | H04W 52/325 |
| 2020/0389849 A1* | 12/2020 | Ryu | H04B 17/309 |
| 2021/0084510 A1* | 3/2021 | Ryu | H04B 17/309 |
| 2021/0112574 A1* | 4/2021 | Hosseini | H04W 8/24 |

* cited by examiner

| W.B.S. | REC'D COMMN. | MAP INFO. 820 UNIQUE IDENTITY | XMIT SIGNAL STRENGTH |
|---|---|---|---|
| 171 | 841 | XXY1 | 90 |
| 172 | 842 | XXY2 | 70 |
| 173 | 843 | XXY3 | 90 |
| ... | | | |

FIG. 9

WIRELESS CHANNEL ACCESS AND POWER ADJUST ACCESS REQUESTS

BACKGROUND

In general, a random access procedure such as PRACH or Physical Random Access Channel is a contention based channel used by respective UE (User Equipment) in a wireless network environment to establish a wireless communication link and request resources for a respective data transfer. For example, the Physical Random Access Channel and is used by UEs to request an uplink allocation from the base station. In the frequency domain, PRACH spans 6 resource blocks of spectrum.

PRACH users typically use a power ramp up mechanism in which the power is ramped up in step-wise manner. For example, according to conventional techniques, after communicating a wireless signal (request) to the wireless base station, the UE listens for a PRACH response from the wireless base station. If the user equipment receives a respective response from the wireless base station, it is known by the user equipment that the user equipment's last wireless power level is sufficient to establish a wireless communication link. Alternatively, if the user equipment does not receive a response, the user equipment ramps up a power a power level of each subsequent attempt to communicate with the wireless base station until the wireless base station eventually receives the communication from the user equipment and provides an appropriate response.

The user equipment is limited to wirelessly communicating at a respective power level. For example, the maximum allowable transmitted power from the UE, the steps usually come from the system through SIBs (system information block).

BRIEF DESCRIPTION OF EMBODIMENTS

There are deficiencies associated with conventional channel access and establishing a respective wireless communication link. For example, the technique of ramping up respective transmit levels is usually time consuming and contributes to an increased number of wireless communication collisions, increased noise floor, etc.

Embodiments herein provide improved implementation of wireless access points and general use of limited wireless bandwidth in a network environment.

More specifically, a wireless network environment includes any number of mobile communication devices such as a first mobile communication device, a second mobile communication device, and one or more wireless base stations. The first mobile communication device transmits a first wireless communication from to establish a wireless communication link with a wireless base station. The first mobile communication device receives communication information (such as connection assistance information) from a second mobile communication device in the wireless network environment. The first mobile communication device uses the communication information from the second mobile communication device to establish the wireless communication link between the first mobile communication device and the wireless base station. Thus, via the communication information, the second mobile communication device assists the first mobile communication device to establish a respective wireless communication link with the wireless base station.

Further embodiments herein include, via the first mobile communication device, receiving the communication information from the second mobile communication device as a response to the second mobile communication device receiving the first wireless communication (such as a channel access request) from the first mobile communication device. For example, in one embodiment, the second mobile communication device performs a discovery of mobile communication devices in the wireless network environment. The second mobile communication device establishes wireless connectivity with the first mobile communication device and communicates the communication information (such as including pathloss information, resource availability information associated with the wireless base station, etc.) to the first mobile communication device.

In still further example embodiments, the second mobile communication device is in wireless communication with the wireless base station. The second mobile communication device produces the communication information, which indicates information such as a magnitude of a wireless pathloss between the second mobile communication device and the wireless base station. The first mobile communication device assumes that the pathloss between the second mobile communication device and the wireless base station is similar to the pathloss between the first mobile communication device and the wireless base station. The pathloss between the second mobile communication device and the wireless base station is substantially the same as the pathloss between the first mobile communication device and the wireless base station.

In one embodiment, the connection assistance information indicates a wireless power level at which the second mobile communication device communicates with the wireless base station. The first mobile communication device uses the power transmit level of the second mobile communication device as a basis to communicate with the wireless base station.

In yet further example embodiments, the first wireless communication is transmitted at a first power level from the first mobile communication device. Based on the communication information (such as pathloss information) received from the second mobile communication device, the first mobile communication device transmits a second wireless communication at a second power level from the first mobile communication device, the second power level being greater than the first power level. In one embodiment, the first mobile communication device selects (and/or derives) the second power level in which to communicate with the wireless base station based on a magnitude of pathloss or wireless power output level as indicated by the communication information from the second mobile communication device.

Further embodiments herein include, at the first mobile communication device, controlling a power level of transmitting a second wireless communication from the first mobile communication device based on the communication information.

In still further example embodiments, the communication information received from the second mobile communication device indicates wireless resources (such as channel sequence information, resources allocated to request wireless base station functions) specified by the wireless base station to support connectivity functions associated with the wireless base station. In response to transmitting the first wireless communication, the first mobile communication device receives a wireless (discovery) message indicating presence of the second mobile communication device in the wireless network environment. The first mobile communication device then establishes wireless connectivity between the first mobile communication device and the second mobile communication device. Via the wireless connectivity, as previously discussed, the first mobile communication device receives the communication information from the second mobile communication device.

Note that the first mobile communication device can be configured to encode the first wireless communication in any suitable manner. For example, in one embodiment, the first mobile communication device encodes the first wireless communication for reception and processing by the wireless base station. Additionally, or alternatively, the first mobile communication device encodes the first wireless communication for reception and processing by the second mobile communication device.

In one embodiment, the second mobile communication device is not available to provide pathloss or power control information to the first mobile communication device. In such an instance, the first mobile communication device receives a wireless communication indicating an identity of a wireless base station; the wireless communication is received at a first power level. The first mobile communication device then determines a second power level based on the identity. The second power level indicates a power level at which the wireless base station transmitted the wireless communication. Via the first power level (such as measurement of the received wireless communication) and the second power level, the first mobile communication device determines a pathloss between the first mobile communication device and the wireless base station.

In accordance with further example embodiments, based on the determined pathloss, the first mobile communication device selects a first transmit power level. Via the first transmit power level, the first mobile communication device wirelessly transmits a first wireless message to the wireless base station. The first mobile communication device communicates the first wireless message to the wireless base station to establish wireless connectivity with the wireless base station.

Further embodiments herein include, via the first mobile communication device, subsequent to wirelessly transmitting the first wireless message, monitoring the wireless network environment for a wireless response from the wireless base station. In response to detecting no response from the wireless base station based on the first wireless message, the first mobile communication device wirelessly transmits a second wireless message from the first mobile communication device to the wireless base station at a second transmit power level. The second wireless message is also communicated to the wireless base station to establish wireless connectivity with the wireless base station. The second transmit power level is greater than the first transmit power level.

In one embodiment, the first mobile communication device determines the second wireless power output level at which to communicate with the wireless base station via a look-up table. For example, the first mobile communication device (or other suitable entity) maps the identity of the received wireless communication to the second power level. In one embodiment, the received identity indicates a type associated with the wireless base station; the type maps to the second power level in the look-up table.

In one embodiment, the first mobile communication device stores power level information, the power level information indicating different levels at which wireless base stations in a network environment transmit communications.

In accordance with still further example embodiments, the first mobile communication device determines the identity of the wireless base station based on processing of SIB (System Information Block) information in the received wireless communication.

Further embodiments herein include the mobile communication device or other suitable resource retrieving an adjustment factor. The first mobile communication device uses the adjustment factor to derive a power level at which to communicate the first wireless message to the wireless base station.

In still further example embodiments, the first mobile communication device communicates the wireless communication of requesting channel access over a random access channel. In such an instance, the first wireless communication is a random access channel communication.

Embodiments herein are useful over conventional techniques. For example, a mobile communication device may not be aware of a pathloss between itself and a respective wireless base station. In such an instance, to establish a respective wireless communication link, the mobile communication device receives guidance on pathloss between one or more nearby mobile communication devices and the wireless base station. Based on the received pathloss information as indicated by the one or more nearby mobile communication devices, the mobile communication device determines at least a starting power level at which to initiate communications with the wireless base station. Additionally, or alternatively, embodiments herein include using an identity of the wireless base station to identify a magnitude at which to communicate with the wireless base station.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: transmit a first wireless communication from a first mobile communication device to establish a wireless communication link with a wireless base station; receive communication information from a second mobile communication device in the wireless network environment; and utilize the communication information from the second mobile communication device to establish the wireless communication link between the first mobile communication device and the wireless base station.

Another embodiment includes a computer readable storage medium and/or system having instructions stored thereon. The instructions, when executed by the computer processor hardware, cause the computer processor hardware (such as one or more co-located or disparately processor devices or hardware) to: at a mobile communication device, receive a wireless communication indicating an identity of a wireless base station, the wireless communication received at a first power level; determine a second power level based on the identity, the second power level indicating a power level at which the wireless base station transmitted the wireless communication; and via the first power level and the second power level, determine a pathloss between the mobile communication device and the wireless base station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 9 is an example diagram illustrating map information indicating wireless transmit levels at which different wireless base stations transmit presence signals according to embodiments herein.

Figure 1:
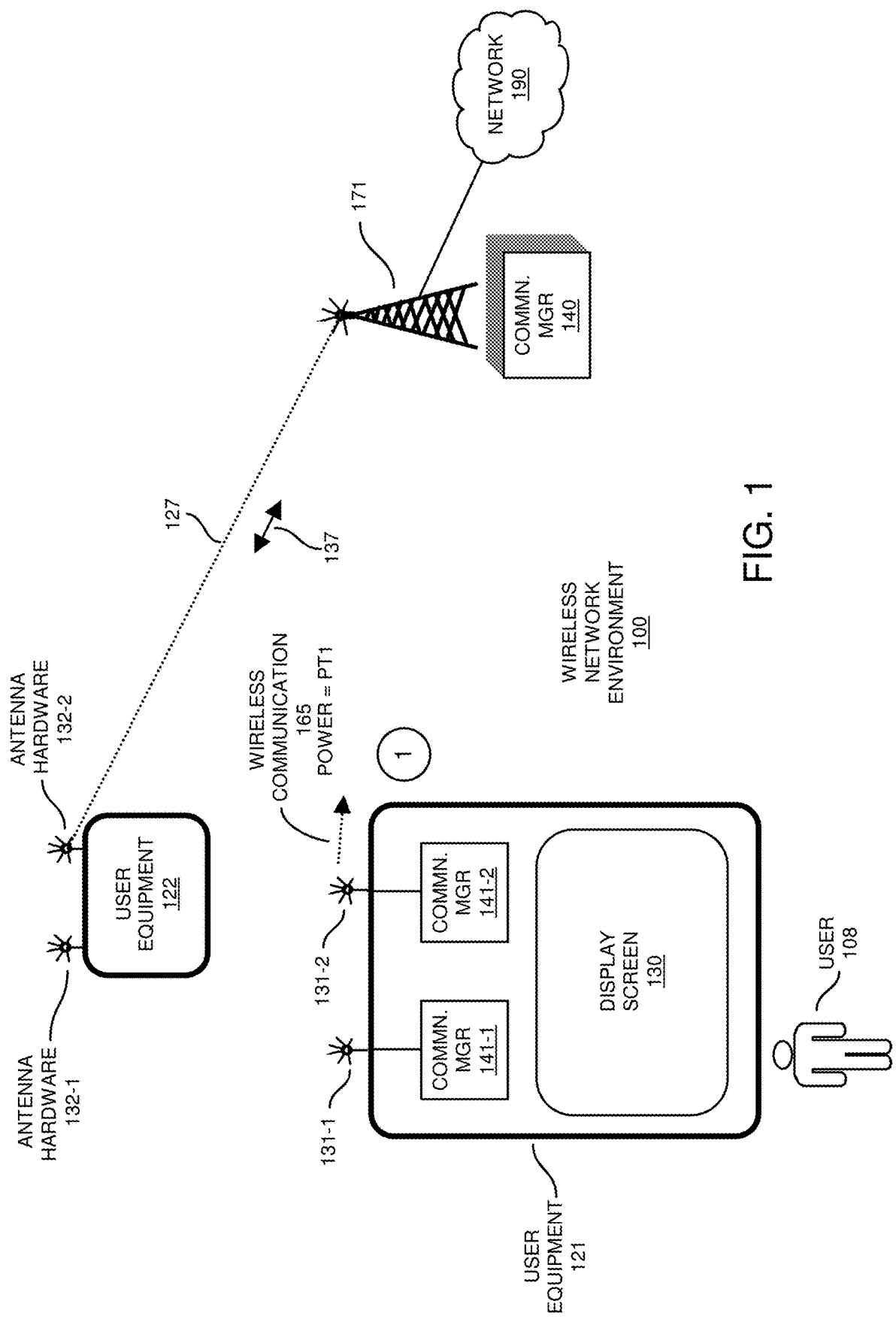
FIG. 1 is an example diagram illustrating user equipment attempting to connect to a respective wireless base station according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A wireless network environment includes a wireless base station and multiple mobile communication devices. A first mobile communication device transmits a first wireless communication from a first mobile communication device to establish a wireless communication link with a wireless base station. The first mobile communication device receives communication information (connection assistance information) from a second mobile communication device in the wireless network environment. The first mobile communication device uses the communication information from the second mobile communication device to establish the wireless communication link between the first mobile communication device and the wireless base station. For example, in one embodiment, the communication information indicates a magnitude of a wireless pathloss associated with or a wireless power level to be used between the second mobile communication device and the wireless base station. The first mobile communication device uses the wireless pathloss and/or wireless power level information as specified by the communication information as a basis to set a power level of communicating one or more additional wireless communications (channel access requests) to the wireless base station.

Now, with reference to the drawings, FIG. 1 is an example diagram illustrating first user equipment attempting to connect to a respective wireless base station and assistance by the second user equipment according to embodiments herein.

In this example embodiment, the network environment 100 includes multiple communication devices such as user equipment 121 (first communication device), user equipment 122 (second communication device), wireless base station 171, communication management resource 141, and network 190.

Note that wireless network environment includes any number of wireless base stations and communication devices. User equipment can be stationary or mobile with respect to the one or more wireless base stations in the wireless network environment 100.

Further in this example embodiment, each communication device includes multiple wireless interfaces to communicate in accordance with one or more wireless communication protocols.

For example, in one embodiment, user equipment 121 includes communication manager 141-1 and antenna hardware 131-1 to communicate according to a first wireless communication protocol. User equipment 121 further includes communication manager 141-2 and antenna hardware 131-2 to communicate in accordance with a second wireless communication protocol.

In one embodiment, the communication manager 141-1 and antenna hardware 131-1 support communications (such as via a first wireless application protocol) with other communication devices such as other user equipment disposed in the wireless network environment 100. The first wireless communication protocol is D2D (Device to Device) or other suitable end device to end device wireless protocol.

In one embodiment, the communication manager 141-1 and antenna hardware 131-2 support communications (such as via a second wireless application protocol) with wireless base station 171 and other communication devices such as wireless base stations disposed in the wireless network environment 100. The second wireless communication protocol is an LTE (Long Term Evolution), 5G, etc., or other suitable wireless protocol.

In a similar manner as previously discussed with respect to user equipment 121, the user equipment 122 includes antenna hardware 132-1 and antenna hardware 132-2 and corresponding communication resources. In one embodiment, the antenna hardware 132-1 supports communications via the first wireless communication protocol. The antenna hardware 132-2 supports wireless communications in accordance with the second wireless communication protocol. Accordingly, the user equipment 122 is able to communicate with wireless base stations disposed in the wireless network environment 100 as well as other user equipment in the wireless network environment 100.

As further shown, the user equipment 122 is in wireless communication with the wireless base station 171 via the wireless communication link 127. The wireless communication link 127 supports wireless uplink and downlink communications 137 between the user equipment 122 and the wireless base station 171. Communication manager 140 supports processing and any of the functions associated with the wireless base station 171.

Based upon wireless communications and received and transmitted power levels of corresponding wireless signals between the user equipment 122 and the wireless base station 171, the user equipment 122 generates a respective path loss value indicative of the wireless path loss between the user equipment 122 and the wireless base station 171 over the wireless communication link 127.

As further shown in this example embodiment, via operation #1, independent of the user equipment 121, the communication management manager 141-2 initiates transmission of wireless communication 165 in response to the respective user 108 attempting to establish a wireless communication link between the user equipment 121 (antenna hardware 131-2) and the wireless base station 171.

In one embodiment, the user equipment 121 starts off at a low transmit power level when transmitting the wireless communication 165 to the wireless base station 171. If the communication manager 141-2 of user equipment 121 does not receive a respective response from the wireless base station 171 in response to transmitting the wireless communication 165 (such as request to establish a respective wireless communication link), the communication manager 141-2 repeatedly increases a respective wireless power level of transmitting the wireless communication 165 (such as a channel access request) in wireless network environment 100 until the wireless base station 171 responds.

Note that the first user equipment 121 can be configured to encode the wireless communications 165 in any suitable manner. For example, in one embodiment, the user equipment 121 encodes the first wireless communication 165 (and any subsequent wireless communications requesting connectivity or wireless service) in accordance with the first wireless communication protocol for reception and processing by the wireless base station 171. Additionally, or alternatively, the user equipment 121 encodes the wireless communication 165 (and any subsequent wireless communications) for reception and processing by the second user equipment 122.

In accordance with further example embodiments, the user equipment 122 monitors one or more wireless channels (such as including an access request channel) in the wireless network environment 100. In one embodiment, the user equipment 122 detects that the user equipment 121 is attempting to establish a respective wireless communication link with the wireless base station 171. More specifically, the antenna hardware 132-2 and corresponding antenna interface in the user equipment 122 receives the wireless communication 165 generated and transmitted by the user equipment 121. Thus, even though the first instance of transmitting the wireless communication 165 (the low power level=PT1) may not be received by the wireless base station 171 because the initial transmit level is too low, the user equipment 122 nearby to the user equipment 121 does receive the wireless communication 165.

In such an instance, based on receipt of the wireless communication 165 (such as a link request) at the antenna hardware 132-2, the user equipment 122 learns that the user equipment 121 is attempting to establish a respective wireless communication link with the wireless base station 171.

In one embodiment, as previously discussed, the user equipment 122 is located in approximately the same area as the user equipment 121. Because the user equipment 122 has already established a respective wireless communication link 127 with the wireless base station 171, the user equipment 122 has knowledge of a respective magnitude of a path loss and/or need transmit power level between the user equipment 122 and the wireless base station 171.

As further discussed below, the user equipment 122 assists the user equipment 121 in establishing a respective wireless communication link with the wireless base station 171.

Figure 2:
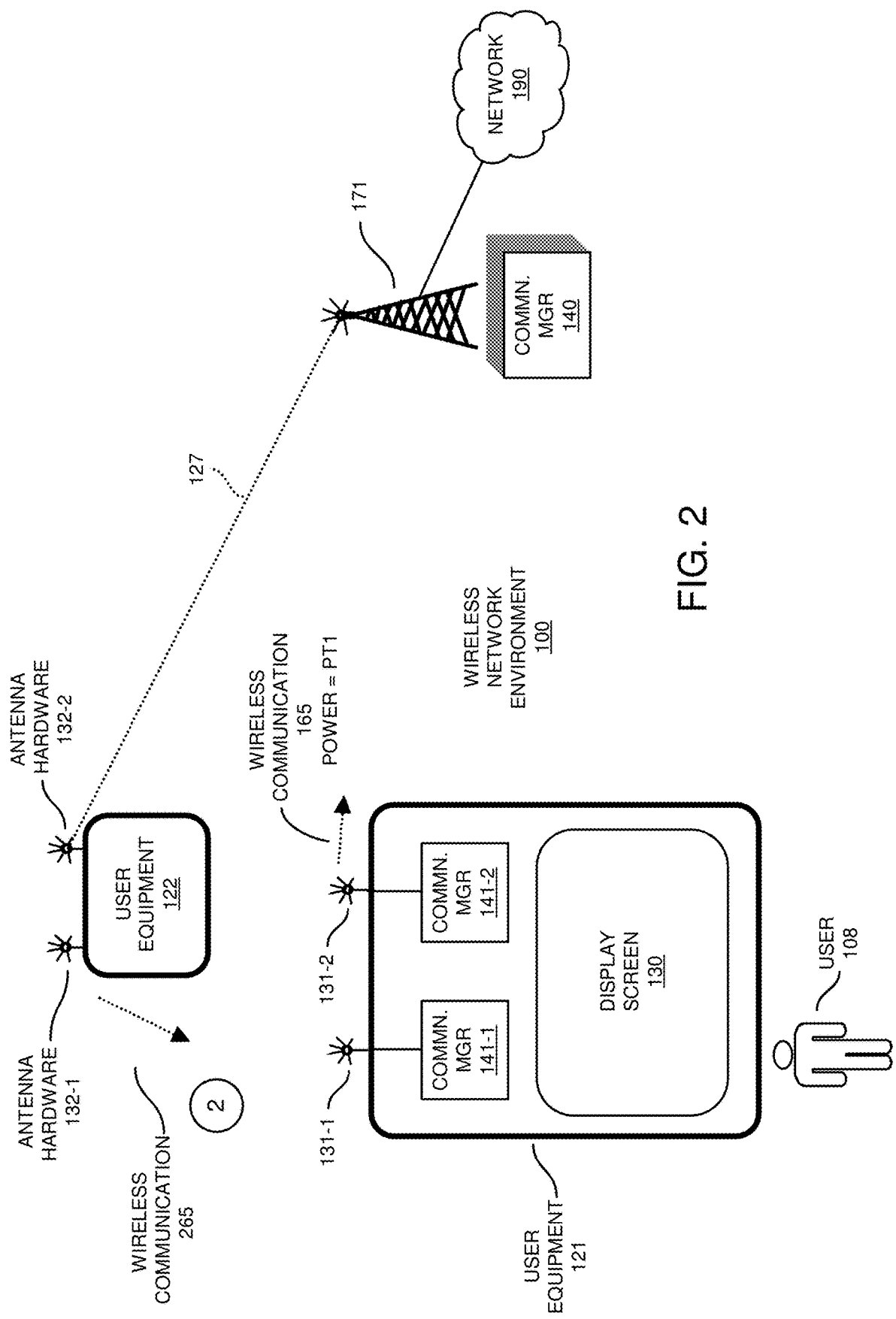
FIG. 2 is an example diagram illustrating discovery of user equipment in a wireless network environment according to embodiments herein.

FIG. 2 is an example diagram illustrating discovery of user equipment communication devices in a wireless network environment according to embodiments herein.

In response to detecting an attempt (as indicated by the wireless communication 165) by the user equipment 121 to establish a respective wireless communication link with the wireless base station 171, via operation #2, the user equipment 122 transmits wireless communication 265 (such as a discovery request, presence notification, etc.) in the wireless network environment 100. In one embodiment, the user equipment 122 transmits the wireless communication 165 to discover and then assist the user equipment 121 in establishing a respective wireless communication link with the wireless base station 171.

Via the antenna hardware 131-1, and operation #2, the user equipment 121 monitors for presence of other user equipment present in the wireless network environment 100. In this instance, the antenna hardware 131-1 of the user equipment 121 receives the wireless communication 265 and learns of the presence of the user equipment 122 in the wireless network environment 100.

Figure 3:
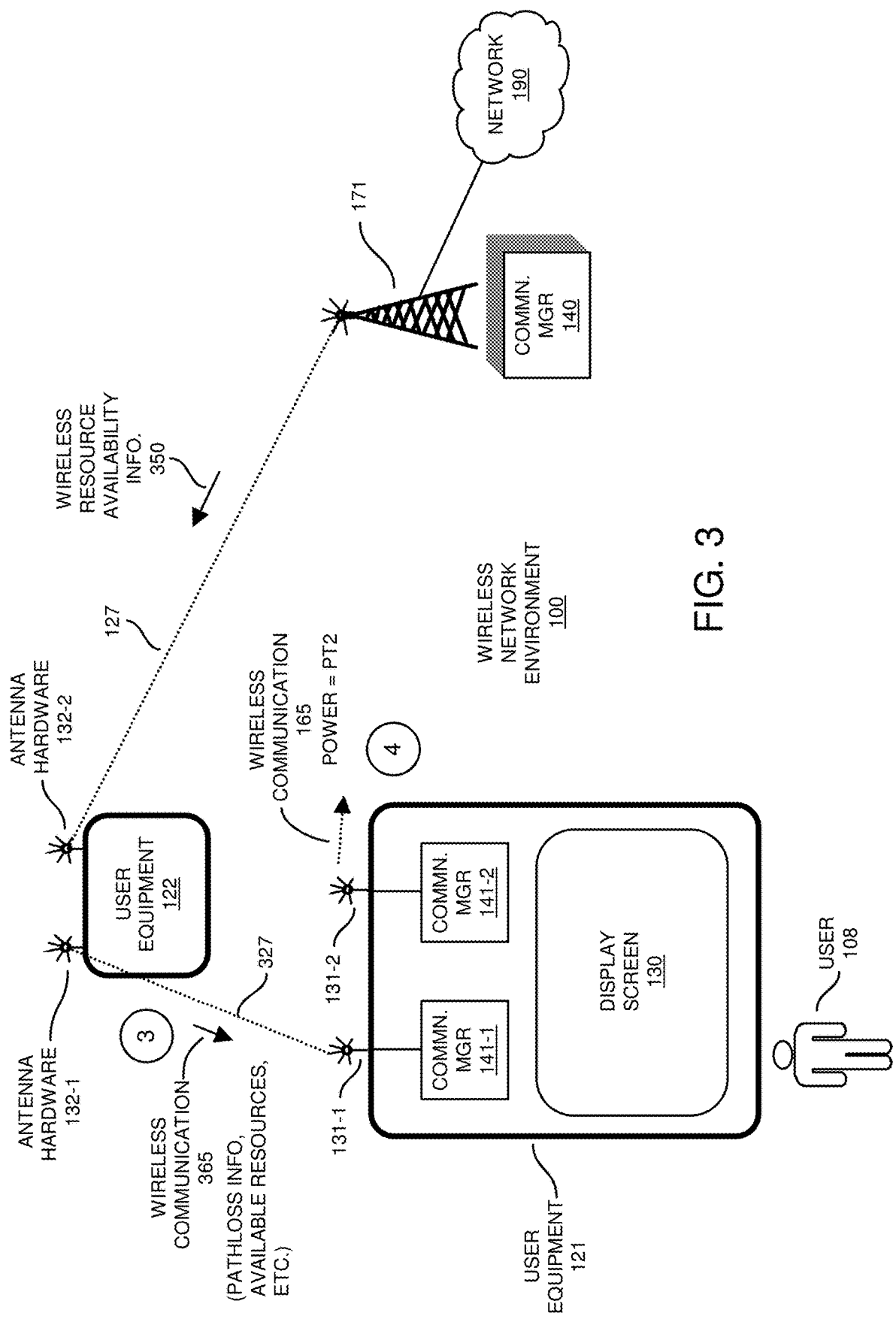
FIG. 3 is an example diagram illustrating connectivity of user equipment and connectivity assistance from another communication device according to embodiments herein.

FIG. 3 is an example diagram illustrating connectivity of user equipment according to embodiments herein.

Via operation #3, the user equipment 121 establishes a respective wireless communication link 327 with the user equipment 122. Via the wireless communication link 327, and corresponding wireless connectivity between the antenna hardware 131-1 of the user equipment 121 and the antenna hardware 132-1 of the user equipment 122, the user equipment 121 receives (from the user equipment 122) connection assistance information about connecting to the wireless base station 171.

For example, via one or more wireless communications 365, the user equipment 122 provides notification of information that is useful for the user equipment 121 to establish a respective wireless communication link between the user equipment 121 and the wireless base station 171. In one embodiment, the wireless communication 365 includes information such as path loss information, information about available resources associated with the wireless base station 171, wireless power transmit level used by the user equipment 122 to communicate with the wireless base station 171, etc. Thus, in one embodiment, the path loss information is wireless power transmit level information implemented by the user equipment 122 to communicate with the wireless base station 171.

As previously discussed, the user equipment 122 is located in proximity to the user equipment 121. In such an instance, embodiments herein include the user equipment 121 assuming that the wireless path loss between the user equipment 122 and the wireless base station 171 is similar to a respective wireless path loss between the user equipment 121 and the wireless base station 171. Knowing such pathloss information alleviates the user equipment 121 and corresponding communication manager 141-2 of the task of repeatedly increasing the power transmit level of wireless communication 165 in the wireless network 100 until the wireless base station 171 responds as shown in FIG. 4.

Figure 4:
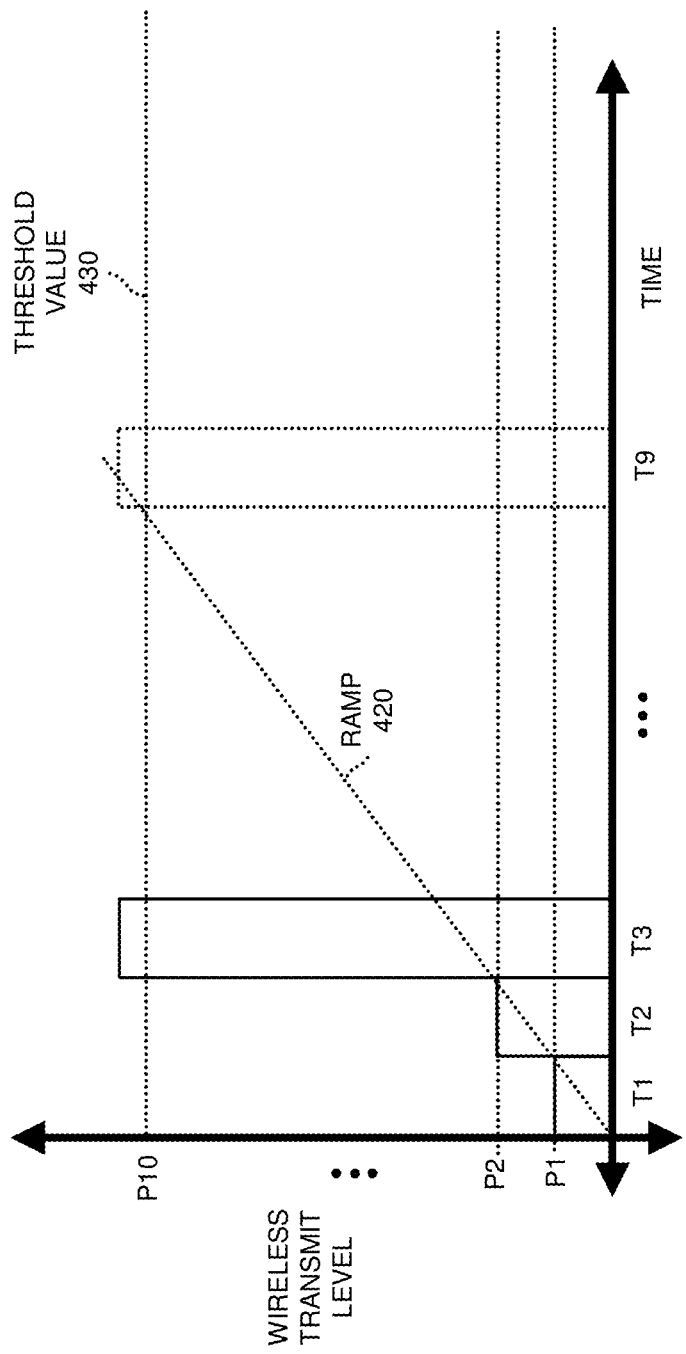
FIG. 4 is an example diagram illustrating different transmit power levels of wirelessly communicating in a wireless network environment to a wireless base station according to embodiments herein.

FIG. 4 is an example diagram illustrating ramping wireless transmit power of wireless communication according to embodiments herein.

As previously discussed, at around time T1, the user equipment 121 initially transmits the wireless communication 165 at the first power level of P1.

Because the user equipment 121 does not receive a respective response from the wireless base station 171, the user equipment 121 increases the power of transmitting the wireless communication 165 to power level P2 at or around time T2.

As previously discussed, the user equipment 121 establishes a respective wireless communication link with the user equipment 122 to receive path loss information associated with the wireless communication link 127 between the user equipment 122 and the wireless base station 171.

In lieu of continuing to increase each subsequent wireless communication 165 at a higher respective power output level as indicated by the ramp 420 as would be the case if the user equipment 122 did not provide any connection assistance information, the user equipment 121 determines that a power level of P10 is required to communicate with the wireless base station 171 based upon the received connection assistance information (such as including wireless communication 365) received from the user equipment 122. In other words, the user equipment 121 determines a respective path loss between the user equipment 121 and the wireless base station 171 based upon the path loss between the user equipment 122 and the wireless base station 171 as indicated by the received connection assistance information.

As further shown in FIG. 4, this alleviates the user equipment 121 from having to continue to ramp a power level of the wireless communication 165 for each of multiple attempts. For example, without receiving the connection assistance information from the user equipment 122, the user equipment 121 would have to wait until time T9 to receive a respective response from the wireless base station 171. However, because the user equipment 121 receives the path loss information (that is connection assistance information) from the user equipment 122, the user equipment 121 knows immediately to jump to the power level of P10, shortening amount of time that is required to establish the respective wireless communication with the wireless vacation link with the wireless base station 171 from time T9 to time T3.

Accordingly, embodiments herein include transmitting a wireless communication 165 at a first power level from the first user equipment 121. Based on the communication information (such as pathloss information) received from the second user equipment 122, the first user equipment 121 transmits the wireless communication 165 at a power level of P10, where power level P10 is much greater than power level P1. Thus, the first user equipment 121 selects (and/or derives) the power level P10 in which to communicate with the wireless base station 171 based on a magnitude of pathloss (or power level used by user equipment 122 to communicate with the wireless base station 171) as indicated by the communication information in the wireless communication 365 from the second user equipment 122.

In still further example embodiments, note that the communication information received from the second user equipment 122 (such as in wireless communications 365 or other communications) indicates wireless resources (such as channel sequence information, resources allocated to request wireless base station functions, etc.) specified by the wireless base station 171 or other suitable entity to support connectivity functions associated with the wireless base station 171.

In this manner, the user equipment 122 provides further assistance to the user equipment 121 to receive wireless services from the wireless base station 171.

Yet further, note that the path loss between the user equipment 121 and the wireless base station 171 may be greater than the path loss between the user equipment 122 and the wireless base station 171. In such an instance, although shortening a ramp time, the increase of the power level to P10 by the user equipment 121 may not be sufficient to convey a respective wireless communication 165 to the wireless base station 171. In such an instance, the user equipment 121 reverts back to continuing to ramp up the wireless transmit output level of communicating the wireless communication 165 to the wireless base station 171.

For example, if the user equipment 121 does not receive a respective response from the wireless base station 171 after communicating the wireless communication 165 at a power level of P10, the user equipment 121 transmits the wireless communication 165 again at a next higher power level of P11, P12, etc. Assume that the wireless base station 171 receives the wireless communication transmitted at the power level of P11 and the wireless base station 171 responds to the user equipment 121 to establish the wireless communication link between the user equipment 121 and the wireless base station 171. In such an instance, the user equipment 121 uses the power level of P11 to support communications between the user equipment 121 and the wireless base station 171.

Figure 5:
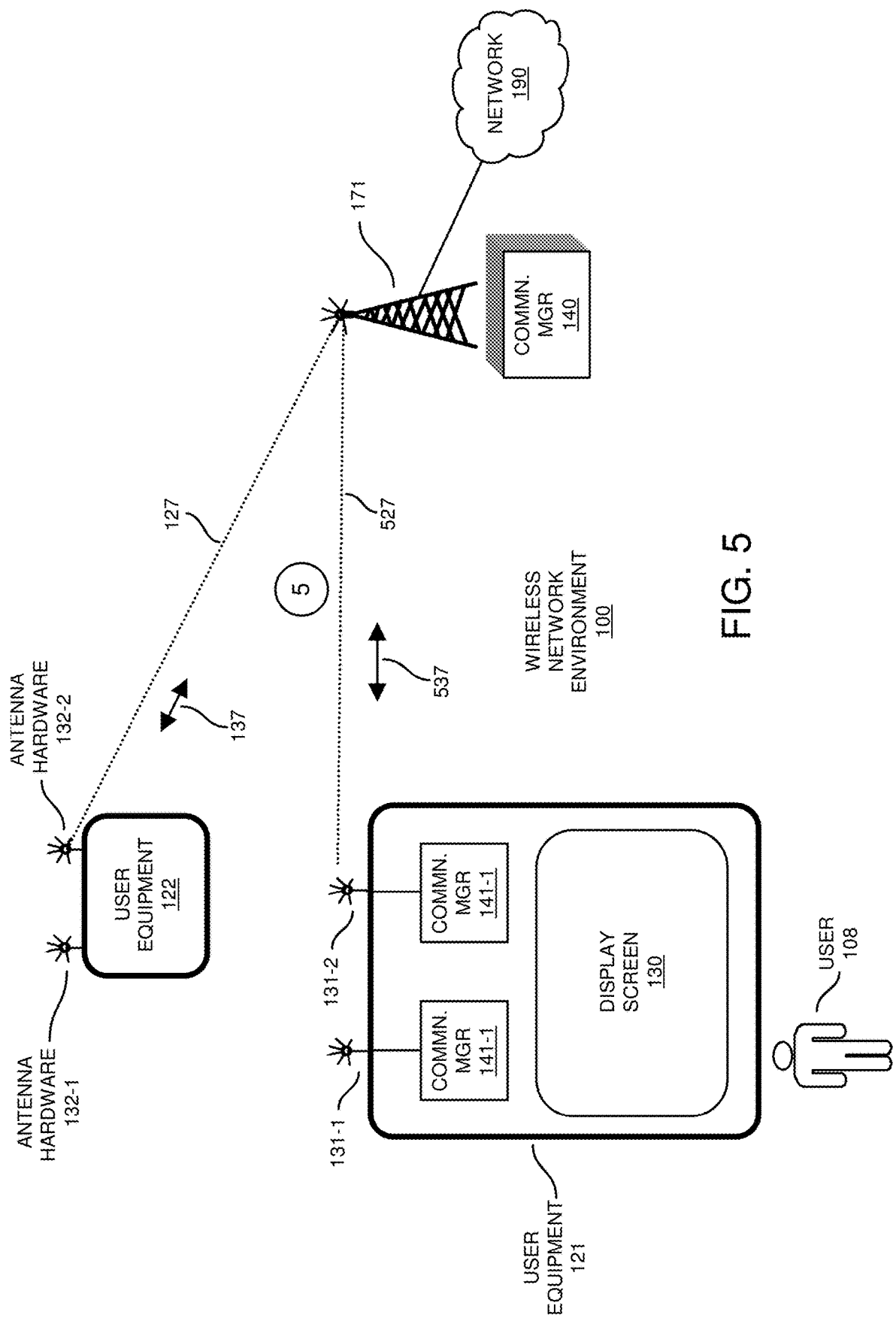
FIG. 5 is an example diagram illustrating connectivity of user equipment with a wireless base station according to embodiments herein.

FIG. 5 is an example diagram illustrating connectivity of user equipment with a wireless base station according to embodiments herein.

In this example embodiment, subsequent to establishing the respective wireless communication link 527 between the antenna hardware 131-2 and the wireless base station 171, the user equipment 121 and the wireless base station 171 are able to communicate with each other. For example, the communication link 527 supports both uplink and downlink communications 537 between the user equipment 121 and the wireless base station 171.

Figure 6:
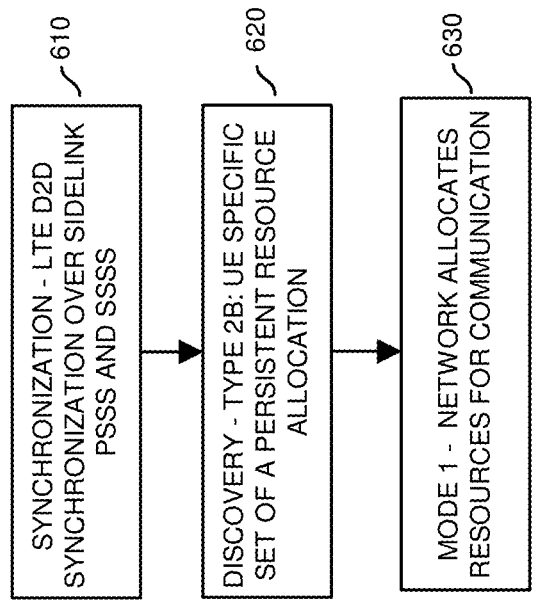
FIG. 6 is an example diagram illustrating synchronization and discovery of user equipment in a wireless network environment according to embodiments herein.

FIG. 6 is an example diagram illustrating synchronization and discovery of user equipment according to embodiments herein.

In operation 610, the user equipment 122 performs synchronization.

In operation 620, the user equipment 122 performs discovery of user equipment in the wireless network environment 100.

In operation 630, the network allocates resources for communication in the wireless network environment 100.

Figure 7:
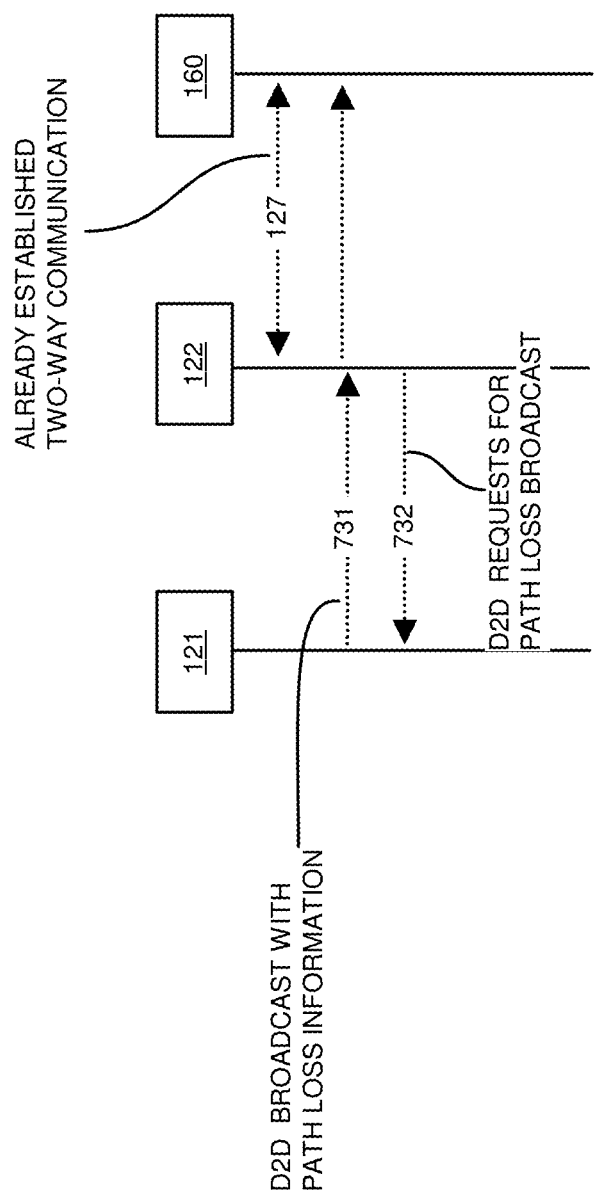
FIG. 7 is an example diagram illustrating communications between end user communication devices according to embodiments herein.

FIG. 7 is an example diagram illustrating a network environment including multiple communication devices according to embodiments herein.

As previously discussed, user equipment 121 trying to get resources will transmit a broadcast message to look for any nearby UE that is also under the same network provider and request UL pathloss information.

There is a likelihood that another UE is present within a reasonable distance (pathloss). In one nonlimiting example embodiment, this pathloss is pre-determined corresponding to a certain distance. The user equipment 121 transmit a one-time signal to determine any nearby user equipment such as user equipment 122. In one embodiment, the user equipment 121 performs a discovery request and learns of user equipment 122.

The nearby UE 122 receives this information and if it's coming from a peer UE (peer UE is on the same network as the UE 121 under consideration). It will broadcast this information.

All UE's near to the user equipment 121 update their information for future use specially if they are still within a reasonable distance (pathloss) at a later time. They can also apply an adjustment factor based on the previous location and new location.

In one embodiment, the information is transmitted over a D2D link, where a special message to request transmitted by a UE another UE in D2D possibly listening to this reads the request and sends a broadcast message.

This broadcast could be limited by each UE by a timeline or pre-determined to prevent flooding by the same UE and in a given area.

The UEs are assumed to have D2D communications with resources allocated by the enodeB (wireless base station 171).

The UE with established link will verify the information heard over a broadcast message. Such as security, group ID, etc., and it matches the ones in its own network, it will broadcast a message with pathloss information which will be stored by the UE anticipating this information.

If the user equipment 121 does not receive a response from the wireless base station within a pre-defined time, the user equipment 121 will revert to the conventional fall back method of ramping the wireless power level output or implement the following method in FIGS. 8-11 to establish a respective wireless communication link.

Figure 8:
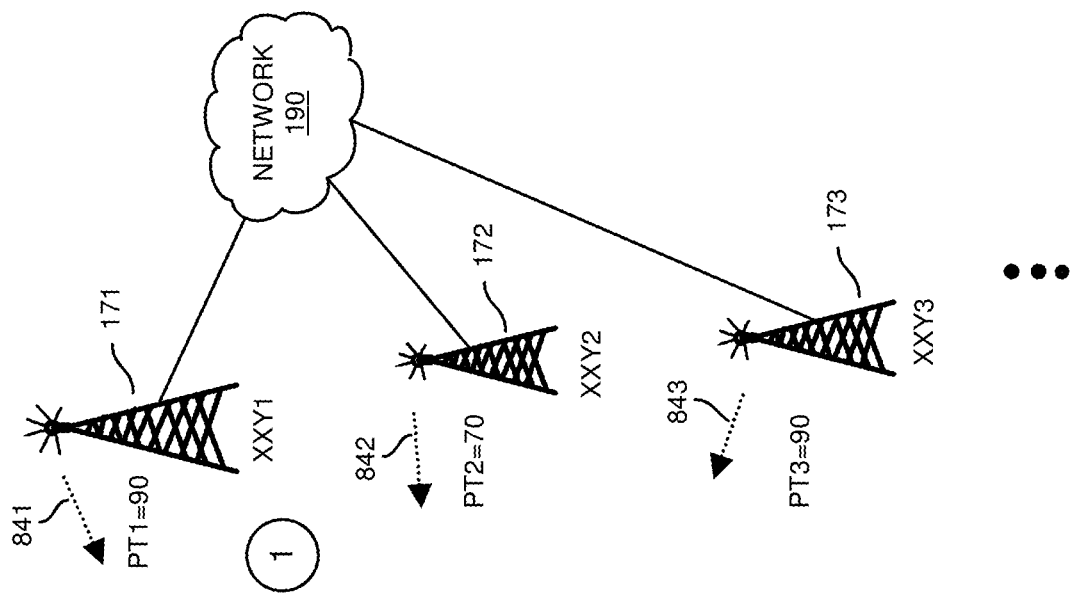
FIG. 8 is an example diagram illustrating transmission of wireless signals from multiple base stations indicating their respective availability according to embodiments herein.
Figure 8:
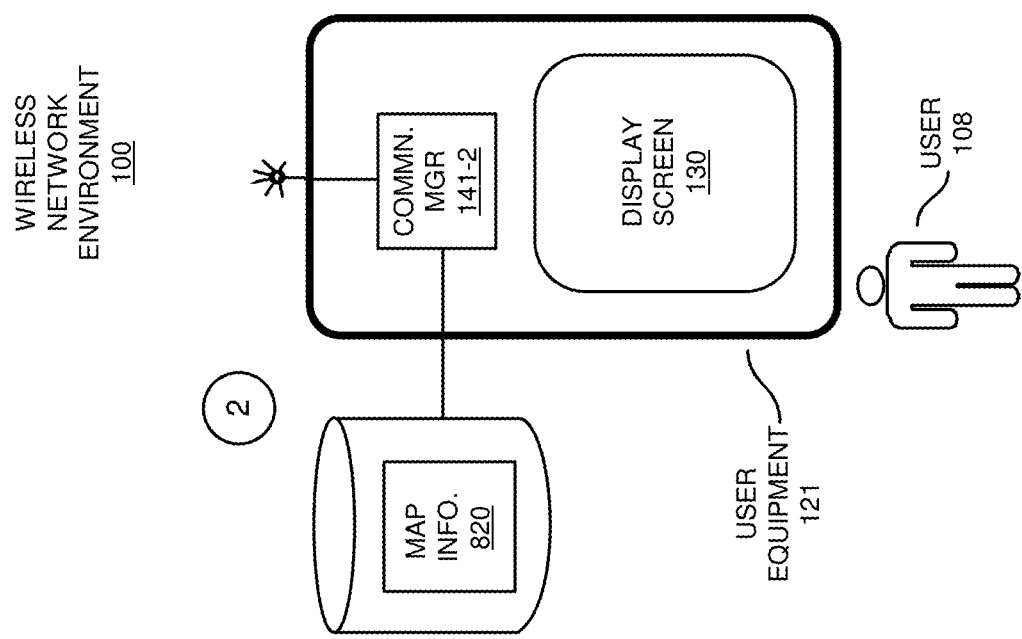

FIG. 8 is an example diagram illustrating transmission of wireless signals from multiple base stations according to embodiments herein.

In this example embodiment, assume that the user equipment 122 is not available to provide pathloss information and/or power control information assistance to the user equipment 121.

As an alternative to the above embodiments, the user equipment 121 receives a wireless communication from each of the wireless base stations 171, 172, 173, etc.

For example, wireless station 171 transmits wireless communication 841 at a power level of PT1=90; the wireless communication 841 includes the unique identifier value of the wireless base station 171 such as XXY1.

The wireless station 172 transmits wireless communication 842 at a power level of PT3=70; the wireless communication 842 includes the unique identifier value of the wireless base station 172 such as XXY2.

The wireless station 173 transmits wireless communication 843 at a power level equal to PT3=90; the wireless communication 143 includes the unique identifier value of the wireless base station 173 such as XXY3.

The user equipment 121 receives each of the wireless communication 841, wireless communication 842, wireless communication 843, and so on.

Via the respective wireless communication 841, the user equipment 121 detects availability of wireless station 171 assigned the identity of XXY1.

Via the respective wireless communication 842, the user equipment 121 detects availability of wireless station 172 assigned the identity of XXY2.

Via the respective wireless communication 843, the user equipment 121 detects availability of wireless station 173 assigned the identity of XXY3.

In one embodiment, each of the received wireless communications from respective wireless base station includes a power level at which the corresponding wireless communication is transmitted.

For example, wireless communication 841 includes the power level PT1=90 at which the wireless base station 171 transmits the wireless communications 841; wireless communication 842 includes the power level PT2=70 at which the wireless base station 172 transmits the wireless communications 842; wireless communication 843 includes the power level PT3=90 at which the wireless base station 173 transmits the wireless communications 843; and so on.

Alternatively, each of the wireless communications does not include information regarding a power level at which the corresponding wireless base station transmitted the wireless communication. In such an instance, as further discussed herein, the user equipment 120 relies on the map information 820 to determine a power level at which each of the wireless base stations transmits the respective wireless communications 841, 842, 843, etc.

In one embodiment, the user equipment 121 determines the identity of the wireless base stations based on processing of SIB (System Information Block) information in the received wireless communications 841, 842, 843, etc.

As discussed below in FIG. 9, the user equipment 121 retrieves power level information from map information 820 to determine a respective signal strength at which the corresponding wireless base stations transmit the wireless communications 841, 842, 843, etc.

FIG. 9 is an example diagram illustrating map information according to embodiments herein.

As shown, the map information 820 maps the unique identity of each respective wireless base stations to a corresponding signal strength at which the wireless station transmitted the received communication.

For example, map information 820 indicates that the wireless base station 171 is assigned the unique identifier value XXY1 and that the wireless base station 171 is configured to transmit the wireless communications 841 at a signal strength (power level) of 90; map information 820 further indicates that the wireless base station 172 is assigned unique identifier value XXY2 and that the wireless base station 172 is configured to transmit the wireless communications 842 at a signal strength of 70; map information 820 further indicates that the wireless base station 173 is assigned unique identifier value XXY3 and that the wireless base station 173 transmits the wireless communications 843 at a signal strength of 90; and so on.

In this manner, via mapping of the receives unique identity value of each of the wireless base stations, the user equipment 121 determines a corresponding signal strength at which the respective wireless stations transmit the wireless communications indicating their identity and thus presence in the wireless network environment 100.

Figure 10:
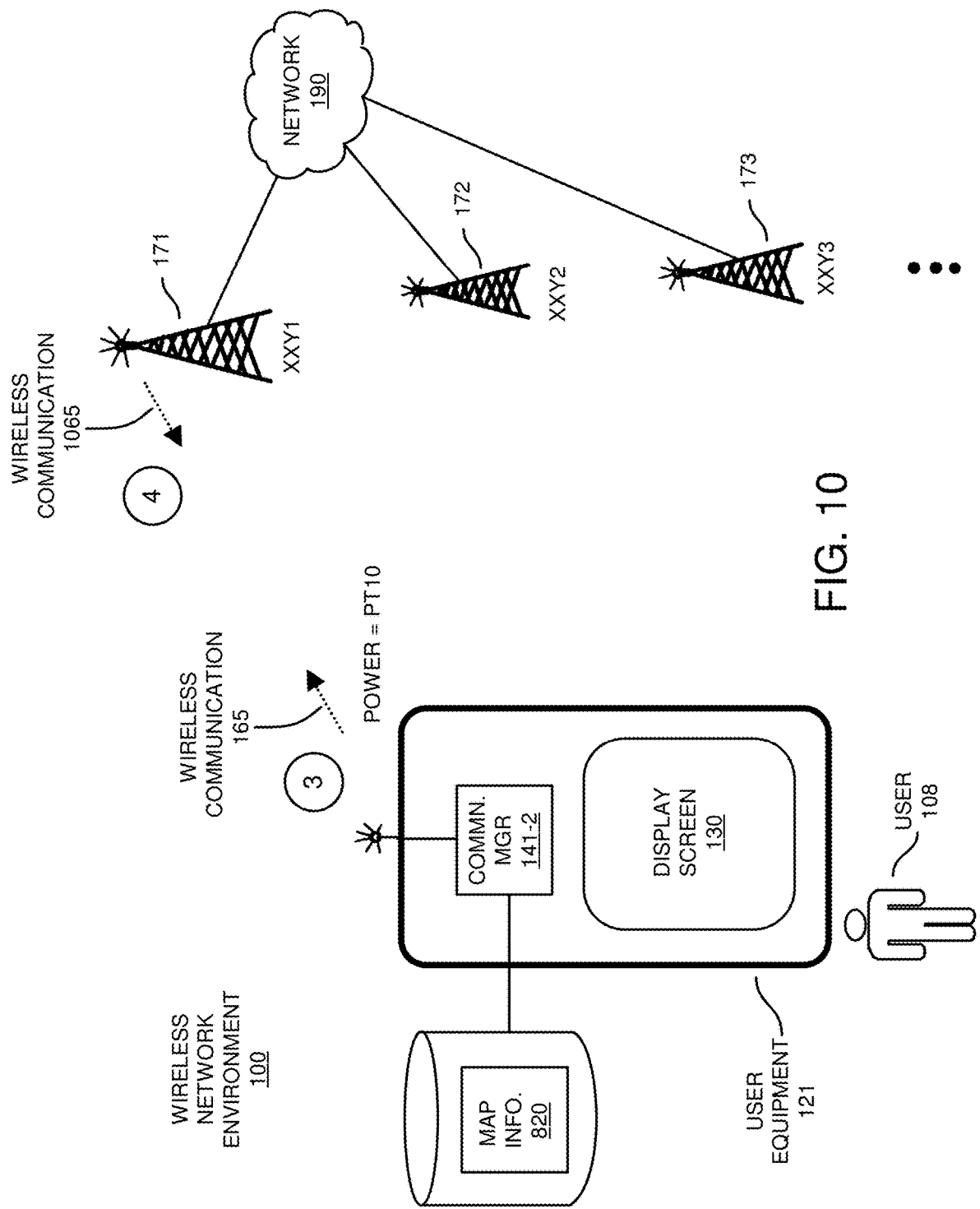
FIG. 10 is an example diagram illustrating control of a wireless power level of wireless signals transmitted from a communication device based on map information according to embodiments herein.

FIG. 10 is an example diagram illustrating control of a power level of wireless signals transmitted from a communication device according to embodiments herein.

In this example embodiment, assume that the user equipment 121 receives the wireless communication 841 at power level X. Via the received power level X of the wireless communications 841, and determining that the wireless base station 171 transmits the wireless communications 841 at a signal strength of 90 as indicated by the map information 820 as previously discussed, the user equipment 121 derives a path lost value indicating a respective path loss between the user equipment 121 and the wireless base station 171.

Further embodiments herein include the user equipment 121 retrieving an adjustment factor. In one embodiment, the user equipment 121 uses the adjustment factor to derive a power level at which to communicate the first wireless message to the wireless base station 171.

In accordance with further example embodiments, based on the determined pathloss, and potentially the adjustment factor if such a parameter is used, the user equipment 121 selects a first transmit power level. Via the first transmit power level (such as PT10), the user equipment 121 wirelessly transmits a first wireless communication 165 (such as a link request over a random access channel) to the wireless base station 171 to establish wireless connectivity with the wireless base station 171.

In one embodiment, the random access channel over which the user equipment 121 transmits the wireless communications 165 is a contention-based channel (such as a PRACH channel) shared by other mobile communication devices attempting to connect to a respective wireless base station in the wireless network environment 100.

Subsequent to transmitting the wireless communication 165, the user equipment 121 monitors the wireless network environment 100 for a wireless response 1065 from the wireless base station 171.

In response to detecting no response from the wireless base station 165 based on the first wireless message, the user equipment 121 wirelessly transmits a second wireless message (wireless communication 165) from the user equipment 121 to the wireless base station 171 at a second transmit power level (PT11) greater than the first transmit power level PT10. The second wireless message (instant of wireless communication 165) is also communicated to the wireless base station 171 to establish wireless connectivity with the wireless base station.

After receiving the respective response 1065 in operation #4, the user equipment 121 and the wireless base station 171 establish a respective wireless communication link.

In one embodiment, the user equipment 121 determines the one or more power levels in which to communicate with the wireless base station 171 via a look-up table. For example, the first mobile communication device (or other suitable entity) maps the identity of the respective wireless base station to a power level that is to be used to communicate with the wireless base station.

In further example embodiments, as previously discussed, the received identity indicates a type associated with the wireless base station; the type maps to the second power level in the look-up table.

Figure 11:
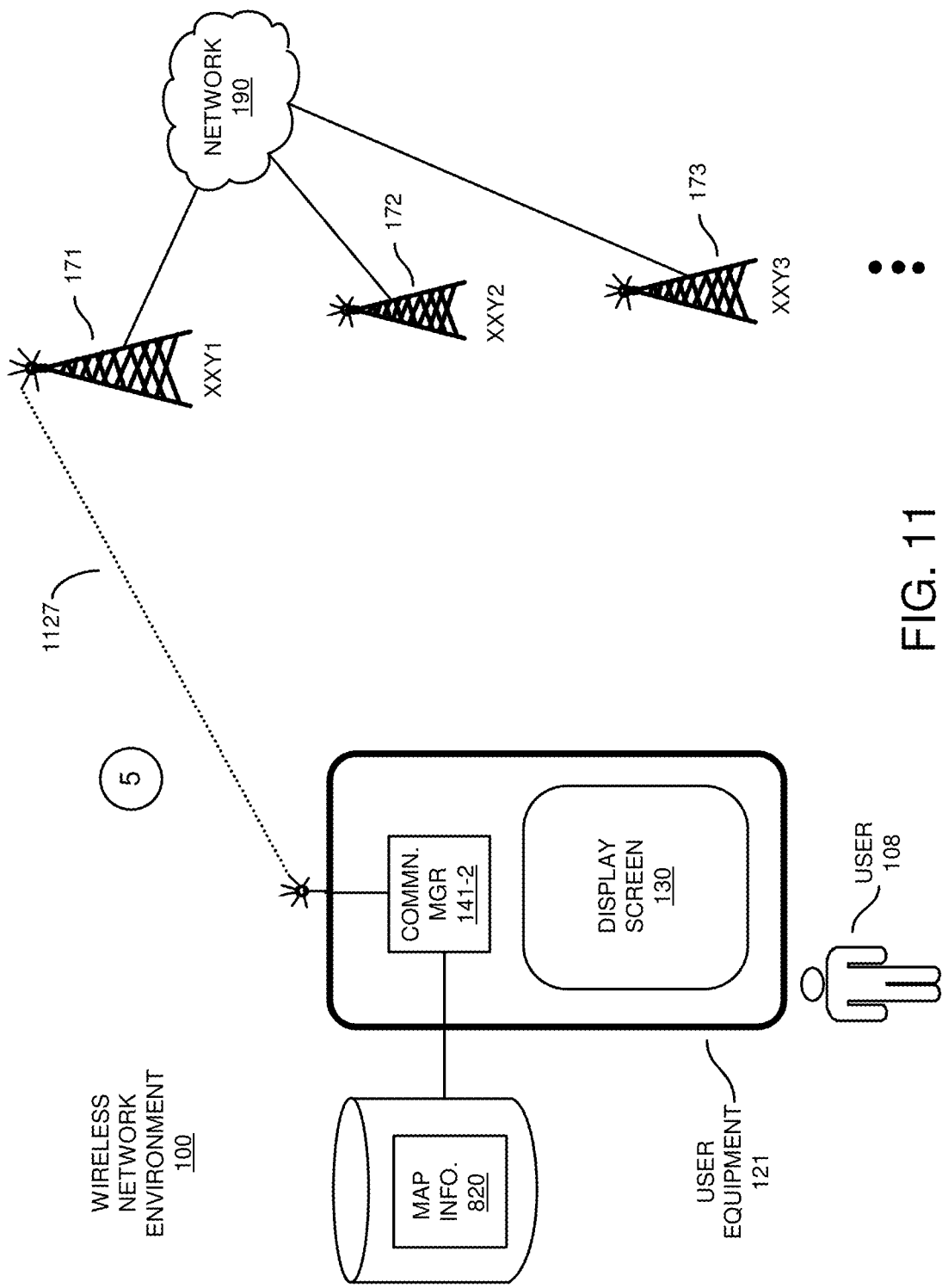
FIG. 11 is an example diagram illustrating establishment of a respective wireless communication link according to embodiments herein.

FIG. 11 is an example diagram illustrating establishment of a respective wireless communication link according to embodiments herein.

As shown, via operation #5, the user equipment 121 establishes the respective wireless communication link 1127 with the wireless base station 171. Wireless communication link 1127 supports both uplink and downlink communications between the user equipment 121 and the wireless base station 171.

Note again that embodiments herein are useful over conventional techniques. For example, a mobile communication device may not be aware of a pathloss between itself and a respective wireless base station. In such an instance, to establish a respective wireless communication link, the mobile communication device receives guidance on pathloss between one or more nearby mobile communication devices and the wireless base station. Based on the received pathloss information as indicated by the one or more nearby mobile communication devices, the mobile communication device determines at least a starting power level at which to initiate communications with the wireless base station.

Alternatively, if a respective nearby user equipment is not available to provide connection assistance, the user equipment 121 uses the identity information to determine a pathloss between the user equipment 121 and the wireless base station 171.

Further Embodiments

Each Network operator has different types of cells operating in its network. i.e., small cells, femto cells, macro cells etc. Each with different power levels and transmission characteristics.

Usually there are a handful of equipment manufacturers (vendor) wireless base stations deployed by an operator.

Each Vendor has a few different types of cells which are identifiable using SIB information received by the UE (i.e, base-station ID of a base station BSID). In such an instance, the user equipment has advanced knowledge of the type of base stations (small cell, macro cell, femto cell, etc.) it is communicating with.

In one embodiment, the information is stored in a tabular form at a respective wireless base station or other suitable entity. The information associated with the wireless base station indicates a maximum transmit power in the downlink direction. Based on this information, in one embodiment, a respective user equipment 121 estimates pathloss from the base station in the downlink and uses this information in the respective uplink (such as adjusted by an uplink factor) to determine a more accurate first transmission instead of using the ramp up mechanism.

For example, the UE 121 receives a base-station ID, and determines its corresponding transmit power and adjustment factor if applicable. The user equipment 121 It then applies one more adjustments for uplink transmission after determining the downlink pathloss. The user equipment 121 transmits the PRACH in accordance with the adjustment factors for the uplink.

Figure 12:
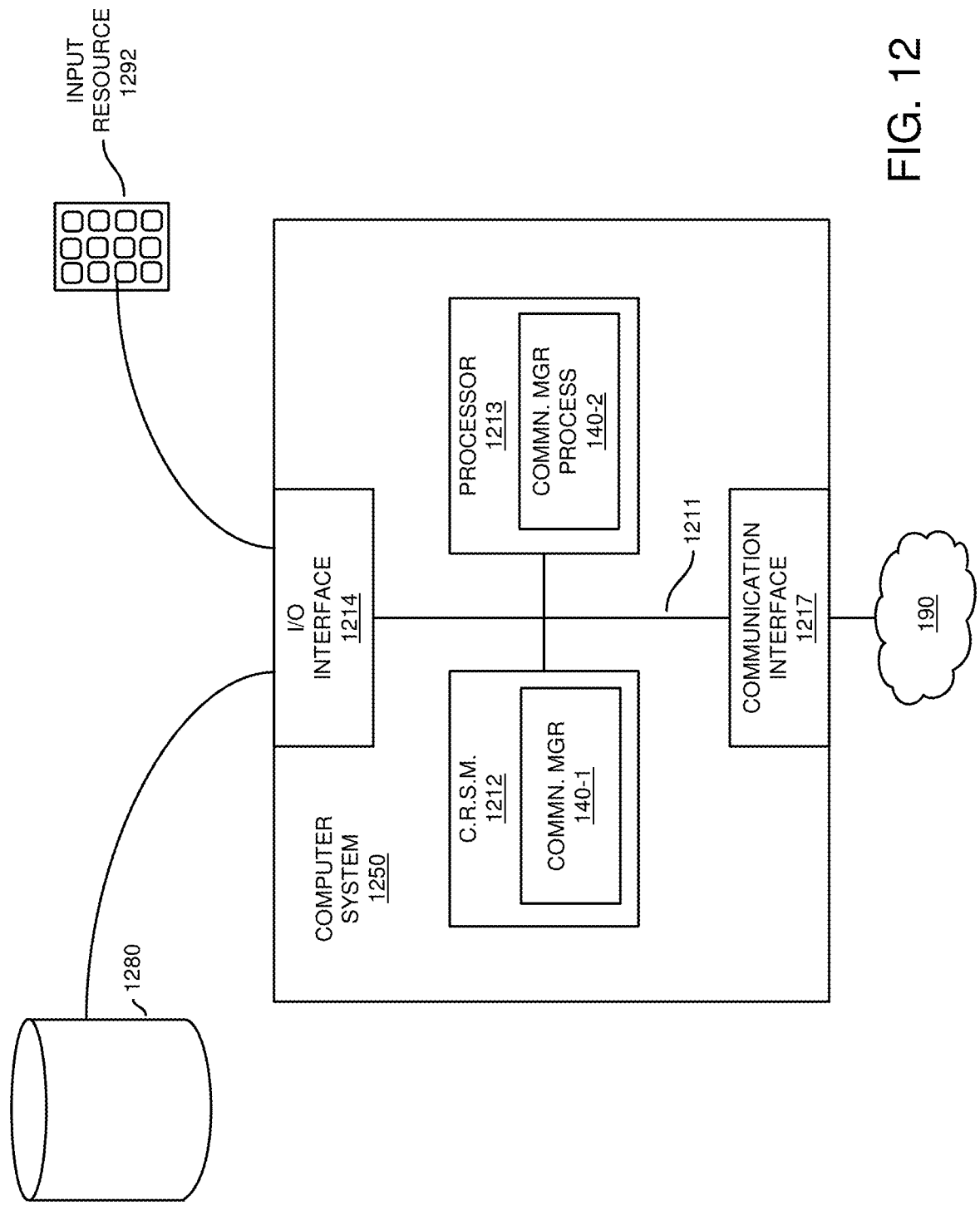
FIG. 12 is an example diagram illustrating example computer hardware and software operable to execute operations according to embodiments herein.

FIG. 12 is an example block diagram of a computer system for implementing any of the operations as previously discussed according to embodiments herein.

Note that any of the resources (such as mobile communication devices, user equipment, wireless stations, wireless base stations, communication management resource, control management resource, etc.) as discussed herein can be configured to include computer processor hardware and/or corresponding executable instructions to carry out the different operations as discussed herein.

For example, as shown, computer system 1250 of the present example includes interconnect 1211 coupling computer readable storage media 1212 such as a non-transitory type of media (which can be any suitable type of hardware storage medium in which digital information can be stored and or retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with management application 140-1 (e.g., including instructions) in a respective wireless station to carry out any of the operations as discussed herein.

During operation of one embodiment, processor 1213 accesses computer readable storage media 1212 via the use of interconnect 1211 in order to launch, run, execute, interpret or otherwise perform the instructions in management application 140-1 stored on computer readable storage medium 1212. Execution of the management application 140-1 produces management process 140-2 to carry out any of the operations and/or processes as discussed herein.

Those skilled in the art will understand that the computer system 1250 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1250 may reside at any location or can be included in any suitable resource in any network environment to implement functionality as discussed herein.

Functionality supported by the different resources will now be discussed via flowcharts in FIGS. 13 and 14. Note that the steps in the flowcharts below can be executed in any suitable order.

Figure 13:
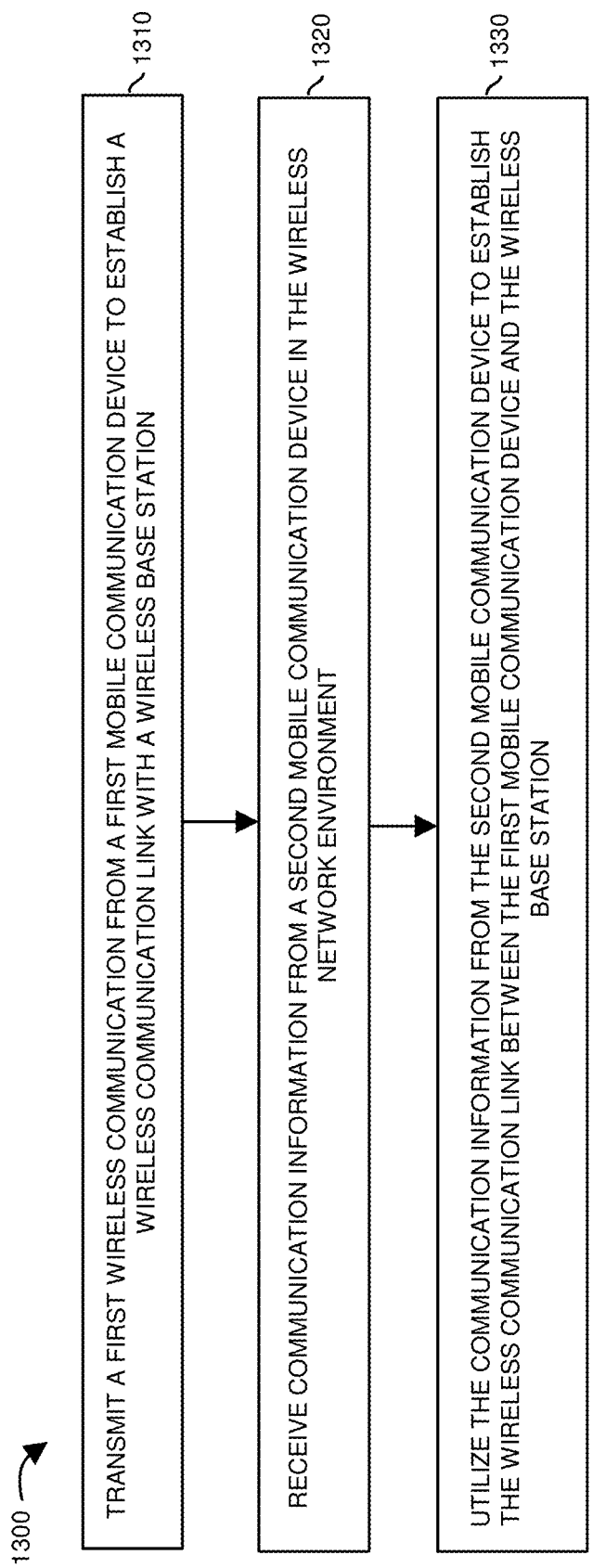
FIG. 13 is an example diagram illustrating a method according to embodiments herein.

FIG. 13 is a flowchart 1300 illustrating an example method according to embodiments herein. Note that there will be some overlap with respect to concepts as discussed above.

In processing operation 1310, the user equipment 121 transmits a wireless communication 165 to establish a wireless communication link with a wireless base station 171.

In processing operation 1320, the user equipment 121 receives communication information (such as via wireless communication 365) from the user equipment 122 in the wireless network environment 100.

In processing operation 1330, the user equipment 121 utilizes the communication information (such as pathloss information, resource availability information, etc.) from the second user equipment 122 to establish the wireless communication link 527 between the user equipment 121 and the wireless base station 171.

Figure 14:
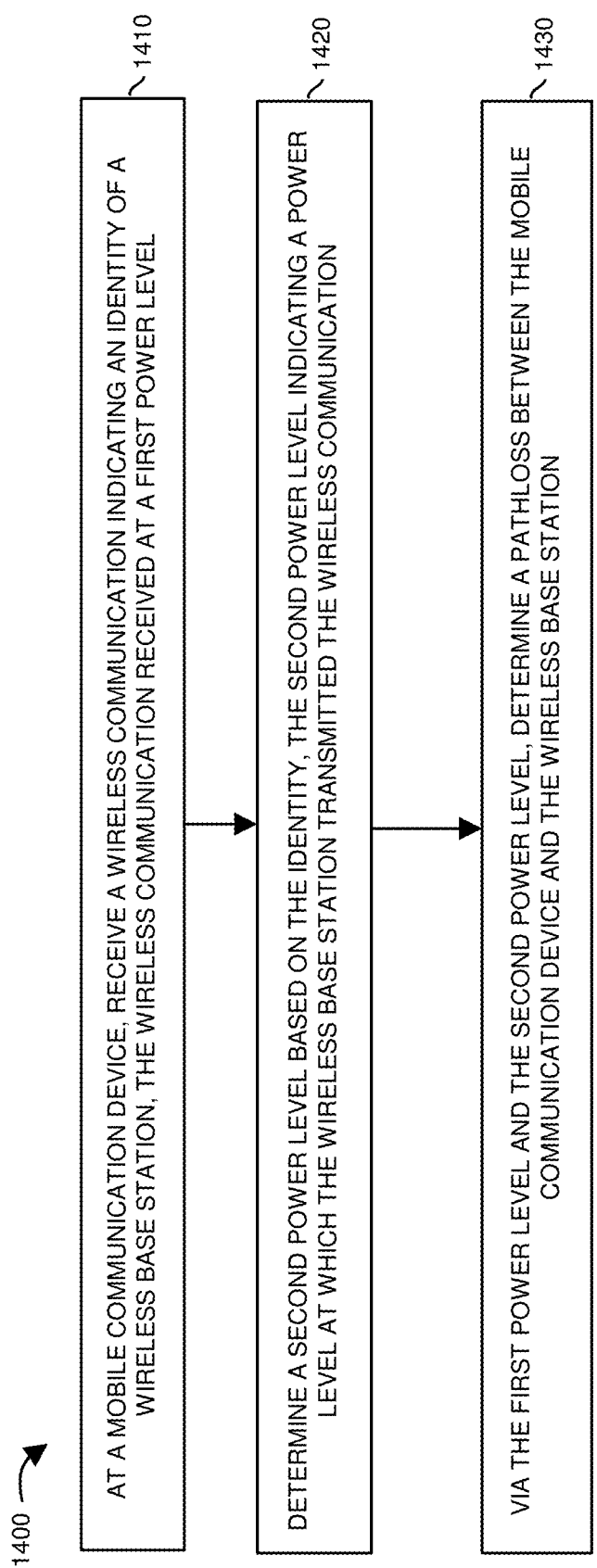
FIG. 14 is an example diagram illustrating a method according to embodiments herein.

FIG. 14 is a flowchart 1400 illustrating an example method according to embodiments herein. Note that there will be some overlap with respect to concepts as discussed above.

In processing operation 1410, the user equipment 121 receives a wireless communication indicating an identity XXY1 of wireless base station 171; the wireless communication is received at a first power level.

In processing operation 1420, the mobile communication device determines a second power level based on the identity. The second power level indicates a power level at which the wireless base station transmitted the wireless communication.

In processing operation 1430, via the first power level and the second power level, the mobile communication device determines a pathloss between the mobile communication device and the wireless base station.

Note again that techniques herein are well suited to facilitate collection of information from one or more wireless station and distribution of the information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    transmitting a first wireless communication from a first mobile communication device to establish a wireless communication link with a wireless base station;
    at the first mobile communication device, receiving communication information from a second mobile communication device in the wireless network environment; and
    at the first mobile communication device, utilizing the communication information from the second mobile communication device to establish the wireless communication link between the first mobile communication device and the wireless base station.

2. The method as in claim 1 further comprising:
    at the first mobile communication device, receiving the communication information from the second mobile communication device as a response to the second mobile communication device receiving the first wireless communication from the first mobile communication device.

3. The method as in claim 1, wherein the second mobile communication device is in wireless communication with the wireless base station, the second mobile communication device producing the communication information, the communication information indicating a magnitude of a wireless pathloss between the second mobile communication device and the wireless base station.

4. The method as in claim 1, wherein the first wireless communication is transmitted at a first power level from the first mobile communication device, the method further comprising:
    based on the communication information, transmitting a second wireless communication at a second power level from the first mobile communication device to the wireless base station, the second power level being greater than the first power level.

5. The method as in claim 4 further comprising:
    selecting the second power level based on a magnitude of pathloss as indicated by the communication information from the second mobile communication device.

6. The method as in claim 1, wherein utilizing the communication information to establish the wireless communication link between the first mobile communication device and the wireless base station includes controlling a power level of transmitting a second wireless communication from the first mobile communication device based on the communication information.

7. The method as in claim 1, wherein the communication information received from the second mobile communication device indicates wireless resources specified by the wireless base station to support connectivity functions associated with the wireless base station.

8. The method as in claim 1 further comprising:
    in response to transmitting the first wireless communication, receiving a message indicating presence of the second mobile communication device in the wireless network environment;
    establishing wireless connectivity between the first mobile communication device and the second mobile communication device; and
    receiving the communication information from the second mobile communication device over the wireless connectivity.

9. The method as in claim 1, wherein the first wireless communication is encoded for reception and processing by the wireless base station.

10. The method as in claim 1, wherein the first wireless communication is encoded in for reception and processing by the second mobile communication device.

11. The method as in claim 1 further comprising:
transmitting the first wireless communication from the first mobile communication device over first antenna hardware of the first mobile communication device; and
receiving the communication information from the second mobile communication device over second antenna hardware of the first mobile communication device.

12. The method as in claim 11, wherein the communication information indicates a pathloss between the second mobile communication device and the wireless base station.

13. The method as in claim 1 further comprising:
selecting a power level at which to transmit a wireless message from the first mobile communication device based on a magnitude of pathloss as indicated by the communication information received from the second mobile communication device.

14. The method as in claim 1, wherein the first mobile communication device transmits the first wireless communication over first antenna hardware of the first mobile communication device to the wireless base station; and
wherein the first mobile communication device receives the communication information from the second mobile communication device over second antenna hardware of the first mobile communication device.

15. The method as in claim 14, wherein the second mobile communication device is in communication with the wireless base station via first antenna hardware of the second mobile communication device; and
wherein the second mobile communication device transmits the communication information from second antenna hardware of the second mobile communication device to the first mobile communication device.

16. The method as in claim 1, wherein the second mobile communication device is in communication with the wireless base station via first antenna hardware of the second mobile communication device; and
wherein the second mobile communication device transmits the communication information from second antenna hardware of the second mobile communication device to the first mobile communication device.

17. The method as in claim 1 further comprising:
at the first mobile communication device, receiving the communication information from the second mobile communication device in response to requesting pathloss information.

18. The method as in claim 1 further comprising:
storing pathloss information associated with a location from which the mobile communication device communicates with the wireless base station; and
utilizing the stored pathloss information at a subsequent instance of establishing wireless connectivity with the wireless base station.

19. The method as in claim 1, wherein the second mobile communication device is nearby to the first mobile communication device; and
at the first mobile communication device, utilizing a determined pathloss between the second mobile communication device and the wireless base station as a basis to determine a pathloss between the first mobile communication device and the wireless base station.

20. The method as in claim 1, wherein utilizing the communication information to establish the wireless communication link includes:
adjusting a power level of transmitting a second wireless communication from the first mobile communication device to the wireless base station based on the communication information received from the second mobile communication device.

21. The method as in claim 20, wherein the communication information from the second mobile communication device indicates a pathloss between the second mobile communication device and the wireless base station.

22. The method as in claim 20, wherein transmitting the second wireless communication includes transmitting the second wireless communication at a second power level from the first mobile communication device to the wireless base station, the second power level being greater than a first power level of the first mobile communication device communicating the first wireless communication to the wireless base station.

23. A system comprising:
a first mobile communication device operative to:
transmit a first wireless communication from a first mobile communication device to establish a wireless communication link with a wireless base station;
receive communication information from a second mobile communication device in the wireless network environment; and
utilize the communication information from the second mobile communication device to establish the wireless communication link between the first mobile communication device and the wireless base station.

24. The system as in claim 23, wherein the first mobile communication device is further operative to:
receive the communication information from the second mobile communication device as a response to the second mobile communication device receiving the first wireless communication from the first mobile communication device.

25. The system as in claim 23, wherein the second mobile communication device is in wireless communication with the wireless base station, the second mobile communication device producing the communication information, the communication information indicating a magnitude of a wireless pathloss between the second mobile communication device and the wireless base station.

26. The system as in claim 23, wherein the first wireless communication is transmitted at a first power level from the first mobile communication device, the first mobile communication device further operative to:
based on the communication information, transmit a second wireless communication at a second power level from the first mobile communication device, the second power level being greater than the first power level.

27. The system as in claim 26, wherein the first mobile communication device is further operative to:
select the second power level based on a magnitude of pathloss as indicated by the communication information.

28. The system as in claim 23, wherein the first mobile communication device is further operative to: control a power level of transmitting a second wireless communication from the first mobile communication device based on the communication information.

29. The system as in claim 23, wherein the communication information received from the second mobile communication device indicates wireless resources specified by the wireless base station to support connectivity functions associated with the wireless base station.

30. The system as in claim 23, wherein the first mobile communication device is further operative to:

in response to transmitting the first wireless communication, receive a message indicating presence of the second mobile communication device in the wireless network environment;

establish wireless connectivity between the first mobile communication device and the second mobile communication device; and receive the communication information from the second mobile communication device over the wireless connectivity.

31. The system as in claim 23, wherein the first wireless communication is encoded for reception and processing by the wireless base station.

32. The system as in claim 23, wherein the first wireless communication is encoded in for reception and processing by the second mobile communication device.

33. Computer-readable storage hardware having instructions stored thereon, the instructions, when carried out by computer processor hardware, cause the computer processor hardware to:

transmit a first wireless communication from a first mobile communication device to establish a wireless communication link with a wireless base station;

at the first mobile communication device, receive communication information from a second mobile communication device in the wireless network environment; and at the first mobile communication device, utilize the communication information from the second mobile communication device to establish the wireless communication link between the first mobile communication device and the wireless base station.

34. A method comprising:

at a mobile communication device, receiving a wireless communication indicating an identity of a wireless base station, the wireless communication received at a first power level;

mapping the identity of the wireless base station to second power level associated with the wireless base station, the second power level indicating a power level at which the wireless base station transmitted the wireless communication; and via the first power level and the second power level, determining a pathloss between the mobile communication device and the wireless base station.

35. The method as in claim 34 further comprising:

based on the pathloss determined via the first power level and the second power level, selecting a first wireless transmit power level; and wirelessly transmitting a first wireless message from the mobile communication device to the wireless base station at the first wireless transmit power level, the first wireless message communicated to the wireless base station to establish wireless connectivity with the wireless base station.

36. The method as in claim 35 further comprising:

subsequent to wirelessly transmitting the first wireless message, at the mobile communication device, monitoring the wireless network environment for a wireless response from the wireless base station; and in response to detecting no response from the wireless base station based on the first wireless message, wirelessly transmitting a second wireless message from the mobile communication device to the wireless base station at a second transmit power level, the second wireless message communicated to the wireless base station to establish wireless connectivity with the wireless base station, the second transmit power level greater than the first transmit power level.

37. The method as in claim 34, wherein the identity indicates a type associated with the wireless base station, the type mapping to the second power level.

38. The method as in claim 34 further comprising:

storing power level information, the power level information indicating different levels at which multiple wireless base stations in a network environment transmit communications.

39. The method as in claim 34 further comprising:

determining the identity of the wireless base station based on processing of SIB (System Information Block) information in the received wireless communication.

* * * * *

UNITED STATES PATENT AND TRADEMARK OFFICE
CERTIFICATE OF CORRECTION

Page 1 of 1

PATENT NO.         : 11,122,525 B1
APPLICATION NO.    : 16/910410
DATED              : September 14, 2021
INVENTOR(S)        : Saran Khalid It is certified that error appears in the above-identified patent and that said Letters Patent is hereby corrected as shown below:

In the Claims

Column 21, Line 37, after "station to", add --a--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*